United States Patent
Morse

(10) Patent No.: US 8,834,665 B1
(45) Date of Patent: Sep. 16, 2014

(54) STAINED GLASS MOSAIC BONDED TO TRANSPARENT PANEL WITH A PERMANENT TEMPLATE AND METHOD OF MAKING

(76) Inventor: Bonnie Meyer Morse, Newberry, FL (US)

( * ) Notice: Subject to any disclaimer, the term of this patent is extended or adjusted under 35 U.S.C. 154(b) by 157 days.

(21) Appl. No.: 13/443,857

(22) Filed: Apr. 10, 2012

Related U.S. Application Data

(60) Provisional application No. 61/517,397, filed on Apr. 19, 2011.

(51) Int. Cl.
*B32B 38/04* (2006.01)

(52) U.S. Cl.
USPC .............................. 156/265; 156/63; 156/300

(58) Field of Classification Search
CPC .. B44C 3/123; B44C 5/0407; B28B 19/0007; B32B 38/0004; B44F 1/063
USPC ........... 156/63, 252, 253, 256, 512, 513, 108, 156/298, 300, 265; 428/38, 46, 47, 49, 55, 428/66.5, 143, 206, 207, 210, 325, 426, 428/FOR. 117; 65/36
See application file for complete search history.

(56) References Cited

U.S. PATENT DOCUMENTS

| | | | | |
|---|---|---|---|---|
| 504,506 A | | 9/1893 | Verhaghen | |
| 519,186 A | * | 5/1894 | Hughes | 65/36 |
| 1,524,998 A | * | 2/1925 | Russell | 156/63 |
| 1,813,901 A | * | 7/1931 | Bayne | 156/63 |
| 3,349,158 A | * | 10/1967 | Maynard | 264/261 |
| 3,382,134 A | * | 5/1968 | Powell | 428/38 |
| 3,420,728 A | * | 1/1969 | Haverstock | 428/38 |
| 3,553,062 A | * | 1/1971 | Berlin | 428/21 |
| 3,940,523 A | * | 2/1976 | Lecoeur et al. | 428/38 |
| 4,036,929 A | * | 7/1977 | Gould | 264/132 |
| 4,318,946 A | * | 3/1982 | Pavone | 428/34 |
| 4,466,937 A | * | 8/1984 | Johnston et al. | 264/256 |
| 4,861,364 A | | 8/1989 | Trujillo | |
| 5,102,706 A | * | 4/1992 | Latte | 428/38 |
| 6,203,635 B1 | * | 3/2001 | Sellars | 156/63 |
| 6,663,732 B1 | * | 12/2003 | Link | 156/63 |
| 2002/0102379 A1 | * | 8/2002 | Saltzman et al. | 428/45 |
| 2006/0127611 A1 | * | 6/2006 | Hunter | 428/34 |

FOREIGN PATENT DOCUMENTS

| | | | | | |
|---|---|---|---|---|---|
| FR | 002797223 | * | 2/2001 | | B44C 1/28 |
| JP | 404016399 | * | 1/1992 | | 156/63 |
| JP | 405038900 | * | 2/1993 | | 65/36 |

* cited by examiner

*Primary Examiner* — Linda L Gray

(57) ABSTRACT

A method for assembling and bonding pieces of stained glass and a permanent template to a transparent panel. Grout is then used to fill in the open spaces between the stained glass pieces to create a stained glass mosaic. This embodiment allows light to pass completely through the stained glass mosaic, illuminating the stained glass mosaic inside of the permanent template and stabilizing the image.

1 Claim, 3 Drawing Sheets

STAINED GLASS MOSAIC BONDED TO TRANSPARENT PANEL WITH A PERMANENT TEMPLATE AND METHOD OF MAKING

CROSS-REFERENCE IN RELATED APPLICATIONS

This application claims the benefit of provisional patent application Ser. No. 61/517,397, filed 2011 Apr. 19 by the present inventor.

BACKGROUND

Prior Art

The following is a tabulation of some prior art that appears relevant:

U.S. Patents

| Pat. No. | Issue Date | Patentee |
|---|---|---|
| 4861364 | 1989 Aug. 29 | Trujillo |
| 504506 | 1893 Sep. 05 | Verhaghen |

Stained glass mosaics are commonly displayed with a single side of the glass bonded to a solid surface. The traditional use of mosaic stained glass allows the surface of the glass to be displayed but does not allow light to travel through the stained glass to enhance and illuminate the colors and variation of the stained glass. Verhaghen describes mosaic art-glass that is stained glass bonded to the surface of a bed glass; however, nothing in Verhaghen's patent reveals any aspect relating to the ability of light to pass through the glass or any reference to stabilizing the glass for various uses and applications.

My embodiment describes a permanent template, bonded to a transparent panel, which serves to stabilize the image and allows light to be focused through the stained glass mosaic. The permanent template around the mosaic stained glass causes the person viewing the mosaic to first focus on the beauty and colors of the stained glass mosaic then the permanent template then serves as a secondary artistic expression, which enhances the stained glass mosaic.

A stained glass template has been proposed—for example, U.S. Pat. No. 4,861,364 (1989), Trujillo. Although the concept of a template was used to outline the stained glass, the template is temporary and subsequently removed. My own patent application proposes a permanent template which aesthetically enhances the design and stabilizes the image for multiple applications.

SUMMARY

In accordance with one embodiment, I propose a stained glass mosaic bonded to a transparent panel with a permanent template.

DRAWINGS

Figures

Figure 1:
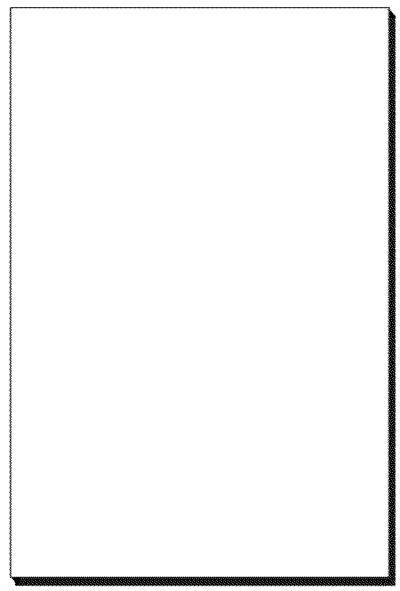
FIG. 1 is a perspective front-side view of a solid surface panel.

REFERENCE NUMERALS 11 drawing of design on solid surface panel
12 cut out design on solid surface panel
13 solid surface panel with design furthermore known as a permanent template
14 transparent panel
15 permanent template bonded to transparent panel
16 individual piece of cut stained glass mosaic pieces
17 stained glass mosaic bonded to transparent panel
18 grouted stained glass mosaic bonded to transparent panel
19 light source used behind stained glass mosaic to illuminate design

DETAILED DESCRIPTION

FIGS. 1-10—First Embodiment

Figure 2:
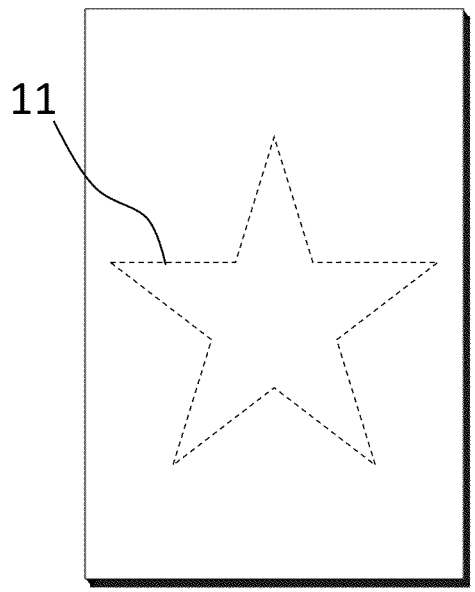
FIG. 2 is a perspective front-side view of a solid surface panel with a design drawn on the solid surface panel.
Figure 3:
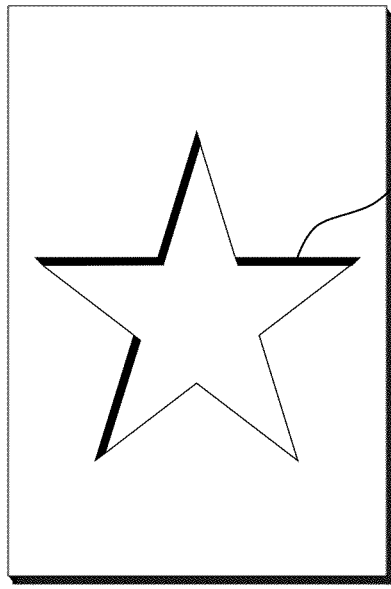
FIG. 3 is a perspective front-side view of a solid surface panel with the drawn design from FIG. 2 cut out of the solid surface panel which becomes the permanent template.
Figure 4:
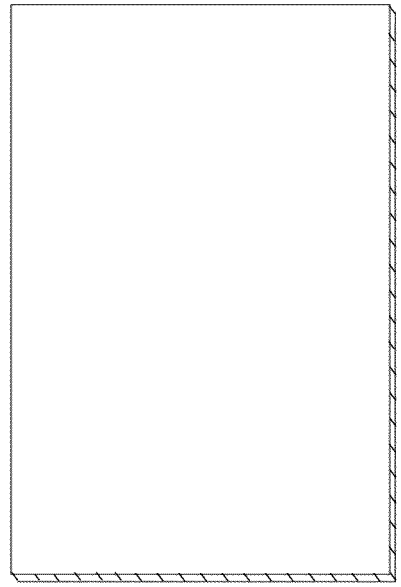
FIG. 4 is a perspective front-side view of a transparent panel.
Figure 5:
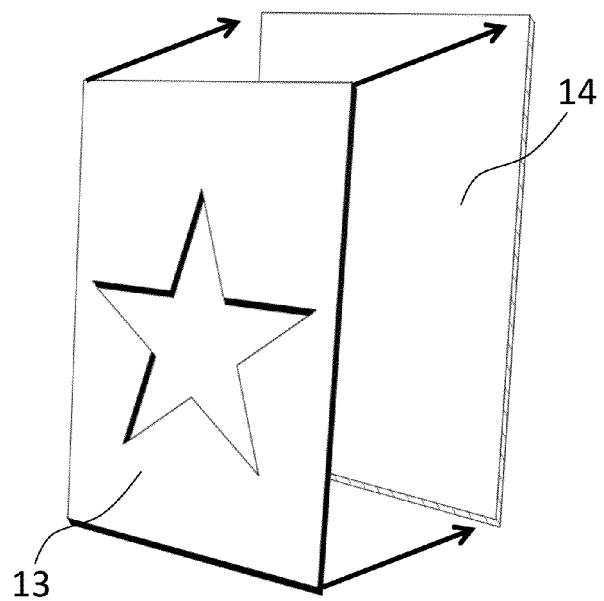
FIG. 5 is a perspective diagonal view of FIG. 3 and FIG. 4 aligned to be bonded to the permanent template from FIG. 3 being placed directly on top of the transparent panel from FIG. 4.
Figure 6:
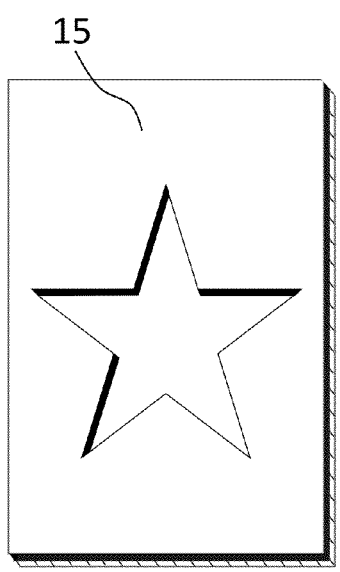
FIG. 6 is a perspective front-side view of the permanent template and transparent panel bonded together.

FIG. 1 shows a perspective front-side view of a solid surface panel. A design is drawn on the solid surface panel as shown in FIG. 2. The drawn design is then cut from the solid surface panel as shown in FIG. 3 which then becomes known as the permanent template. FIG. 4 is the front-side view of a transparent panel. FIG. 5 shows the diagonal view of the permanent template aligned to the transparent panel, in preparation to be bonded together. The permanent template and transparent panel are shown bonded together in FIG. 6.

Figure 7:
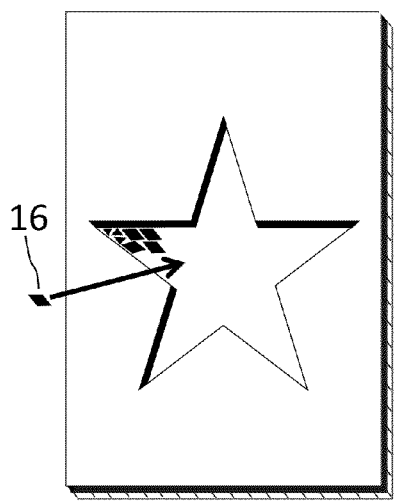
FIG. 7 is a perspective front-side view of stained glass mosaic pieces being bonded to the transparent panel with the permanent template.
Figure 8:
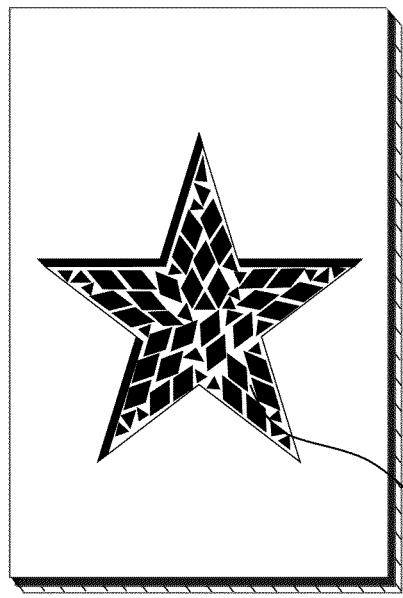
FIG. 8 is the completion of the stained glass mosaic pieces being placed on top of the transparent panel with the permanent template.
Figure 9:
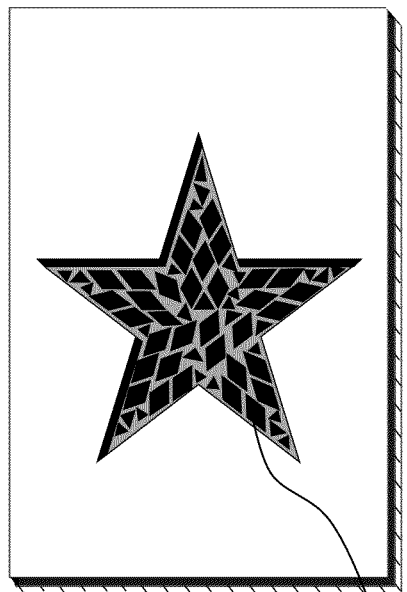
FIG. 9 is the perspective front-side view of the grouted stained glass mosaic that is bonded to the transparent panel with the permanent template surrounding the design.

The stained glass mosaic pieces are shown as being bonded to the transparent panel with the permanent template in FIG. 7. The completion of the stained glass mosaic pieces are shown in FIG. 8. FIG. 9 shows the perspective front-side view of the stained glass mosaic completely grouted to bond all of the glass and wood together. Finally, the stained glass mosaic is shown diagonally with the transparent panel bonded to the permanent template and the light illuminating the stained glass mosaic.

Operation

FIGS. 1, 2, 3, 4, 5, 6, 7, 8, 9, 10

Figure 10:
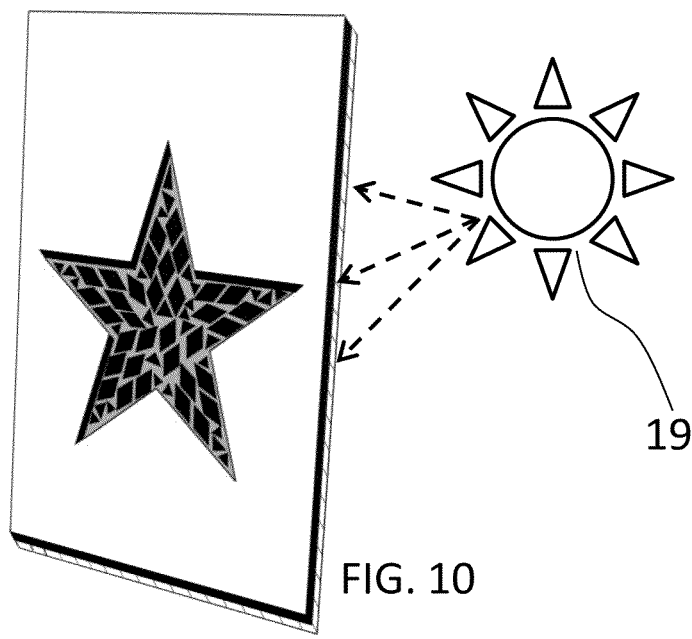
FIG. 10 is the perspective diagonal view of light illuminating the stained glass mosaic on a transparent panel with the permanent template.

Initially, a design is cut out of a solid surface panel, which becomes a permanent template as shown in FIG. 3. The permanent template is then bonded using an adhesive to a transparent panel (FIG. 6), this strengthens both the permanent template and the transparent panel in preparation of the introduction of the stained glass mosaic. Stained glass is then cut into various shapes and bonded to the transparent panel with the permanent template surrounding the stained glass mosaic (FIG. 7). Finally, grout is used to fill in all of the area around the bonded stained glass to the inside edges of the permanent template (FIG. 9). The grout adds more strength and reinforcement to the stained glass mosaic and causes any introduction of light to filter through the stained glass mosaic. Light exposure behind the stained glass mosaic illuminates the stained glass mosaic and the permanent template becomes a secondary artistic enhancement (FIG. 10).

CONCLUSION, RAMIFICATIONS, AND SCOPE

Accordingly, the reader will see that the stained glass mosaic on a transparent panel with a permanent template can be used to stabilize the stained glass mosaic and enhance the aesthetic value of the overall image. In addition, when the stained glass mosaic is strengthened and reinforced by the permanent template bonded to the transparent panel, the mosaic has additional advantages in that:

it allows light to pass through the stained glass mosaic and the permanent template becomes a secondary artistic enhancement;

it permits the stained glass mosaic and bonded permanent template to become more stabile so that the stained glass mosaic can to be integrated into a variety of formats including, but not limited to, stand alone framed artwork, cabinetry, furniture and door panels.

Although the description above contains some specifications, those should not be construed as limiting the scope of the embodiment but as merely providing some illustrations.

I claim:

1. A method for assembling a stained glass mosaic with a permanent template which comprises:

drawing a design on a solid surface wood panel;

cutting out and removing the design from the solid surface wood panel to form said permanent template which outlines a mosaic fit for component stained mosaic glass pieces, the mosaic fit having internal edges;

permanently bonding said permanent template to a transparent panel using adhesive;

cutting said stained glass into said component stained glass mosaic pieces;

bonding said component stained glass mosaic pieces to said transparent panel, having said permanently bonded permanent template, within the mosaic fit as defined by said permanent template where the mosaic fit surrounds the bonded stained glass mosaic pieces; and applying grout around said bonded stained glass mosaic pieces thereby filling all open areas within said mosaic fit, as defined by said permanent template, up to the inside edges of the mosaic fit to bond the bonded component stained glass mosaic pieces and the permanently bonded wood permanent template together.

* * * * *